UNITED STATES PATENT OFFICE.

JOSEPH POPPING, OF NEW YORK, N. Y., ASSIGNOR TO HIMSELF AND WILLIAM L. GODFREY, OF SAME PLACE.

IMPROVEMENT IN WELDING IRON AND STEEL.

Specification forming part of Letters Patent No. 145,445, dated December 9, 1873; application filed November 21, 1873.

*To all whom it may concern:*

Be it known that I, JOSEPH POPPING, of the city, county, and State of New York, have invented a new and Improved Process of Welding Iron and Steel; and that the following is a full, clear, and exact description of the same.

This invention is in the nature of an improvement in the process of welding iron and steel; and the invention consists in applying between the surfaces to be welded a compound of borax, iron filings, and prussiate of potassa, and subjecting the iron to a red heat and pressure or percussion, and thereby welding the same.

My present invention is, more particularly, an improvement on that patented by me on the 16th day of September, 1873. As is well known, in welding iron it has been necessary to heat the pieces to be welded together to a white heat, and that, while this process of welding answers for welding iron, it does not, without great care and danger of destroying the steel, answer for welding steel to steel or steel to iron, for the reason that the white heat required does in many instances destroy the steel. Hence, more or less difficulty has always attended the welding of iron and steel together. By my invention, however, I am enabled to weld iron to steel and iron to iron without difficulty. To do this, I simply moisten the surfaces of the metal it is designed to weld with water, and sprinkle on the wet surfaces, with the fingers, a compound consisting of one pound of pulverized calcined borax, one pound of fine iron filings, and four ounces of pulverized prussiate of potassa, intimately mixed together, the moistened surfaces of the iron causing the above compound to adhere to them. The two surfaces to be welded are then placed together and wired, or otherwise held in place, and put into a fire and brought up to a red heat, or to a temperature of 600° or 700° Fahrenheit. The red-hot metal may then be passed between rolls or placed under a hammer, when the rolling or hammering will complete the process, forming a strong and perfect weld, the welded surfaces being intimately blended together.

In the patent obtained by me, as above mentioned, the welding compound consisted only of pulverized calcined borax and iron filings; but I have found, by practice, that, while that compound will make a good weld at red heat, under some circumstances, yet, if scale and other impurities happen to be between the surfaces to be welded, a perfect uniting or blending of such surfaces is prevented. I have, therefore, in this present improvement of mine, added the new element of prussiate of potassa to the before-mentioned patented compound. By this additional element the scale and other impurities between the iron unite with the prussiate of potassa and readily yield to the boracic flux, so that no obstacle is interposed to prevent the perfect uniting of the two surfaces.

Not only do I produce a perfect weld between the two pieces of metal, but, as is obvious, my welding process necessarily results in a saving of cost, for less fuel is required to bring the iron up to a red heat than is required to bring it to a white heat—the ordinary welding temperature.

The prussiate of potassa in the above operation may be calcined, which will facilitate the welding to some extent.

It is obvious that the proportionate amount of the above ingredients may be varied more or less without particularly affecting the result.

Having described my invention, as above, what I claim as new, and desire to secure by Letters Patent, is—

1. For welding purposes, a compound composed of calcined borax, iron filings, and prussiate of potassa, in the proportions, and applied in the manner, hereinbefore described.

2. The process, hereinbefore described, of welding iron and steel, viz., applying to the surfaces to be welded the compound hereinbefore named, joining the prepared surfaces of the metal together, heating them red-hot, and hammering or rolling the same.

JOSEPH POPPING.

Witnesses:
G. M. PLYMPTON,
H. L. WATTENBERG.